US012768519B2

(12) United States Patent
Zeng

(10) Patent No.: US 12,768,519 B2
(45) Date of Patent: Oct. 20, 2026

(54) LIGHT EFFECTOR AND FLASH LIGHT

(71) Applicant: GODOX PHOTO EQUIPMENT CO., LTD., Shenzhen (CN)

(72) Inventor: Weijun Zeng, Shenzhen (CN)

(73) Assignee: GODOX PHOTO EQUIPMENT CO., LTD., Shenzhen (CN)

( * ) Notice: Subject to any disclaimer, the term of this patent is extended or adjusted under 35 U.S.C. 154(b) by 50 days.

(21) Appl. No.: 18/863,018

(22) PCT Filed: Nov. 17, 2022

(86) PCT No.: PCT/CN2022/132413
§ 371 (c)(1),
(2) Date: May 8, 2025

(87) PCT Pub. No.: WO2023/245972
PCT Pub. Date: Dec. 28, 2023

(65) Prior Publication Data
US 2026/0085820 A1 Mar. 26, 2026

(30) Foreign Application Priority Data
Jun. 23, 2022 (CN) ........................ 202221590134.X

(51) Int. Cl.
*F21V 17/16* (2006.01)

(52) U.S. Cl.
CPC .................................... *F21V 17/16* (2013.01)

(58) Field of Classification Search
CPC .......... F21L 4/005; F21V 13/02; F21V 13/12; F21V 5/006; F21V 9/083; F21V 14/025;
(Continued)

(56) References Cited

U.S. PATENT DOCUMENTS 3,832,075 A * 8/1974 Arai ........................ F21V 5/048 403/14
4,151,584 A * 4/1979 Labrum ................ F21V 7/0025 362/373
(Continued)

FOREIGN PATENT DOCUMENTS

CN 101430073 1/2011
CN 207181926 4/2018
(Continued)

OTHER PUBLICATIONS

EPO, Extended European Search Report for EP Application No. 22947707.0, Sep. 5, 2025.
(Continued)

*Primary Examiner* — Jong-Suk (James) Lee
(74) *Attorney, Agent, or Firm* — Hodgson Russ LLP

(57) ABSTRACT

A light effect device includes an adapter seat and a focusing assembly provided along an axis of the light effector. The first connection member comprises a second connection portion and a first connection portion, the first connection portion being arranged on the adapter, and the second connection portion being arranged on the focusing assembly. The second connection portion and the first connection portion are in a snap-fit connection, so as to limit the focusing assembly and the adapter in the axial direction of the light effect device, thus connecting the adapter and the focusing assembly together and helping to change the adapter on the focusing assembly, so as to adapt to flashes of different lamp bases.

20 Claims, 7 Drawing Sheets

(58) Field of Classification Search

CPC ...... F21V 14/065; F21V 14/085; F21V 14/08; F21V 21/406; F21V 17/002; F21V 17/02; F21V 17/166; F21V 17/16; F21V 17/18; F21V 17/20; F21V 17/164; F21V 17/107; F21V 17/104; F21V 17/14; G03B 21/2046; G03B 21/145; G03B 21/006; G03B 2215/055; G03B 15/0442; G03B 15/03; G03B 15/06; G03B 15/07; G03B 15/02

See application file for complete search history.

(56) References Cited

U.S. PATENT DOCUMENTS

| | | | | | |
|---|---|---|---|---|---|
| 4,217,047 | A * | 8/1980 | Jacksen | G03B 15/02 396/4 |
| 4,520,435 | A * | 5/1985 | Baldwin | F21S 8/033 362/453 |
| 4,992,918 | A * | 2/1991 | Shioiri | F21V 19/04 362/372 |
| 5,321,449 | A * | 6/1994 | Coccoli | G03B 23/105 353/43 |
| 5,738,437 | A * | 4/1998 | Ilagan | F21V 17/14 362/311.1 |
| 5,951,137 | A * | 9/1999 | Bortz | G03B 21/16 353/96 |
| 6,244,730 | B1 * | 6/2001 | Goldberg | F21V 17/20 362/268 |
| 6,623,124 | B2 * | 9/2003 | Okura | G03B 21/001 353/101 |
| 10,042,238 | B1 * | 8/2018 | Zhang | G03B 21/003 |
| 11,506,367 | B1 * | 11/2022 | Zhu | F21V 23/023 |
| 2005/0254233 | A1 * | 11/2005 | Alessio | F21V 14/065 362/169 |
| 2008/0137345 | A1 * | 6/2008 | Wimberly | F21V 14/02 362/368 |
| 2010/0296066 | A1 * | 11/2010 | Ou Yang | F21V 14/065 362/249.02 |
| 2012/0140463 | A1 * | 6/2012 | Kinzer | F21V 5/007 362/231 |
| 2013/0322115 | A1 * | 12/2013 | Parker | G02B 6/0011 362/614 |
| 2014/0247602 | A1 * | 9/2014 | Kinzer | F21V 5/008 362/331 |
| 2018/0188641 | A1 | 7/2018 | Chen | |
| 2019/0132544 | A1 * | 5/2019 | Xi | F21S 8/032 |
| 2021/0310636 | A1 * | 10/2021 | Melzner | H05B 47/155 |
| 2022/0146080 | A1 * | 5/2022 | Gu | F21V 14/06 |
| 2022/0146802 | A1 * | 5/2022 | Gao | G02B 15/1441 |

FOREIGN PATENT DOCUMENTS

| | | |
|---|---|---|
| CN | 208888556 | 5/2019 |
| CN | 208888562 | 5/2019 |
| CN | 211952438 | 11/2020 |
| CN | 213957809 | 8/2021 |
| CN | 215895198 | 2/2022 |
| CN | 111149051 | 5/2022 |
| CN | 217587851 | 10/2022 |
| JP | 2005221856 | 8/2005 |

OTHER PUBLICATIONS

WIPO, International Search Report for PCT/CN2022/132413, Feb. 14, 2023.

* cited by examiner

LIGHT EFFECTOR AND FLASH LIGHT

CROSS-REFERENCE TO RELATED APPLICATIONS

This application is a national stage entry under 37 U.S. C. § 371 of International Application No. PCT/CN2022/132413, filed on Nov. 17, 2022, which claims priority to Chinese Patent Application No. 202221590134.X, filed on Jun. 23, 2022, the entire disclosures of which are hereby incorporated herein by reference.

TECHNICAL FIELD

The present application relates to the technical field of photographic flash light, and particularly relates to a light effector and a flash light.

BACKGROUND

In the shooting process, due to a variety of different photographic needs and different photographic light effects, photographic light effects are adjusted to get the photographer's desired photo effect. The flash light is used as an auxiliary light source in photography, and a light effector can be applied to the flash light to assist in adjusting the light effect in photography, and the light effector is equipped with a screen sheet for adjusting the light and shadow effects. Because a shape of the light head of the existing flash light is not uniform, such as a square shape, and a round shape, thus the existing flash light needs to be equipped with a special light effector whose shape is coincident with that of the light head, which is not suitable for each other, and has not high generality. When the user has a number of flash lights with different shapes of light heads, it is necessary to equip a number of light effectors that fit the shape of the light head simultaneously, thus the user needs to purchase a number of different light effectors, which is more costly to use and more troublesome to store, and greatly affects the user's experience.

SUMMARY

There is provided a light effector according to embodiments of the present application. The technical solution is as below:

TECHNICAL SOLUTION

According to a first aspect of embodiments of the present application, there is provided a light effector includes an adapter seat and a focusing assembly provided along an axis of the light effector; the focusing assembly is provided with a screen sheet accommodation cavity for mounting a screen sheet, the adapter seat is capable of being assembled to an external light head, and a light transmission hole of the adapter seat, a light transmission hole of the focusing assembly, and the screen sheet accommodation cavity are located at the same axis; the light effector further includes a first connection member provided between the adapter seat and the light effector; the first connection member includes a first connection portion and a second connection portion, the first connection portion is provided on the adapter seat and the second connection portion is provided on the focusing assembly; and the second connection portion is snap-fit with the first connection portion, to limit the focusing assembly and the adapter seat in the axis of the light effector, and to make the first connection portion and the second connection portion detachable from each other.

According to a second aspect of embodiments of the present application, there is provided a flash light includes the light effector and a light head, the light head is provided on an end of an adapter seat of the light effector away from a focusing assembly, and the light head is detachably connected to the adapter seat.

DETAILED DESCRIPTION OF THE EMBODIMENTS

The present application provides a light effector and a flash light, and in order to make the objects, technical solutions and effects of the present application clearer and more explicit, the present application is described in further detail hereinafter with reference to the accompanying drawings and by way of embodiments. It should be understood that the specific embodiments described herein are only for explaining the present application and are not intended to limit the scope of the present application.

A light effector is an auxiliary device for adjusting light during photography, and is provided with a screen sheet inside. The screen sheet is provided with a structure, such as a pattern, for adjusting the light effect. A light head emits light, which is emitted along the axis of the light effector and passes through the screen sheet and the lens structure in turn, and then illuminates an object to be supplemented with light. Depending on the photographic light effect needed for the lighted region of the projection, the light passes through the screen sheet and forms the lighted region corresponding to the pattern. However, after the screen sheet is provided on the existing light effector, the position of the screen sheet is fixed, and therefore, the angle of the screen sheet can no longer be adjusted.

Figure 1:
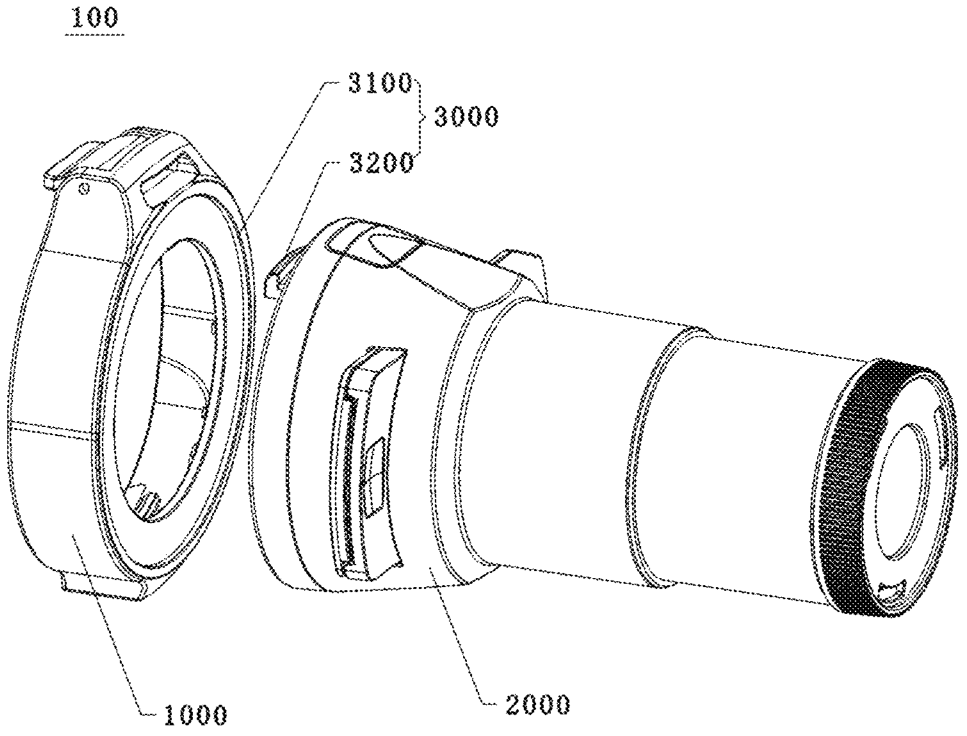
FIG. 1 is a three-dimensional view of a light effector shown.
Figure 2:
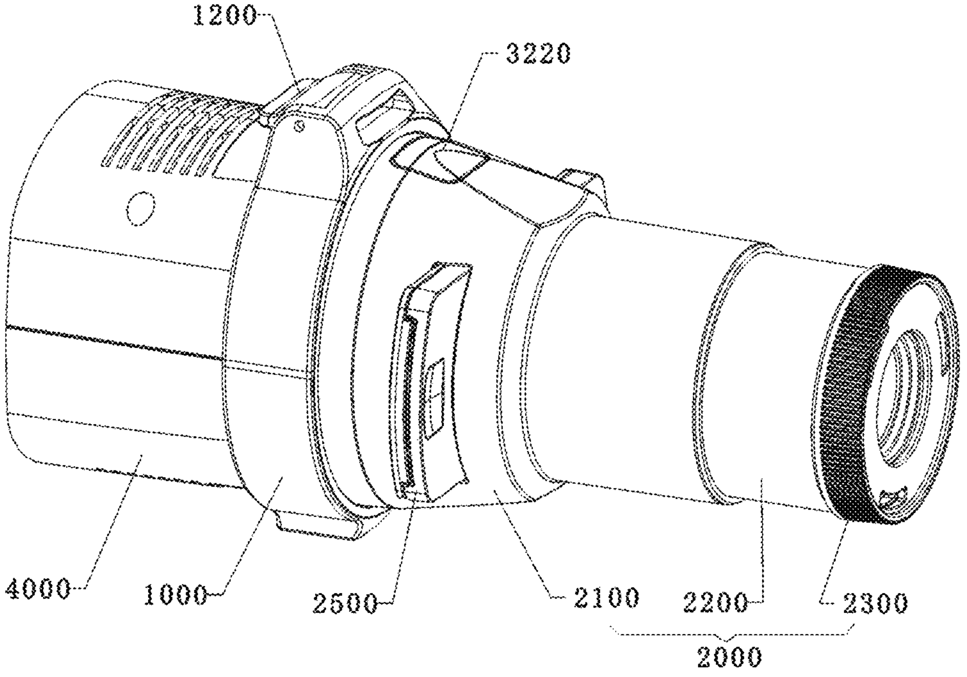
FIG. 2 is a first three-dimensional view of the flash light shown.
Figure 3:
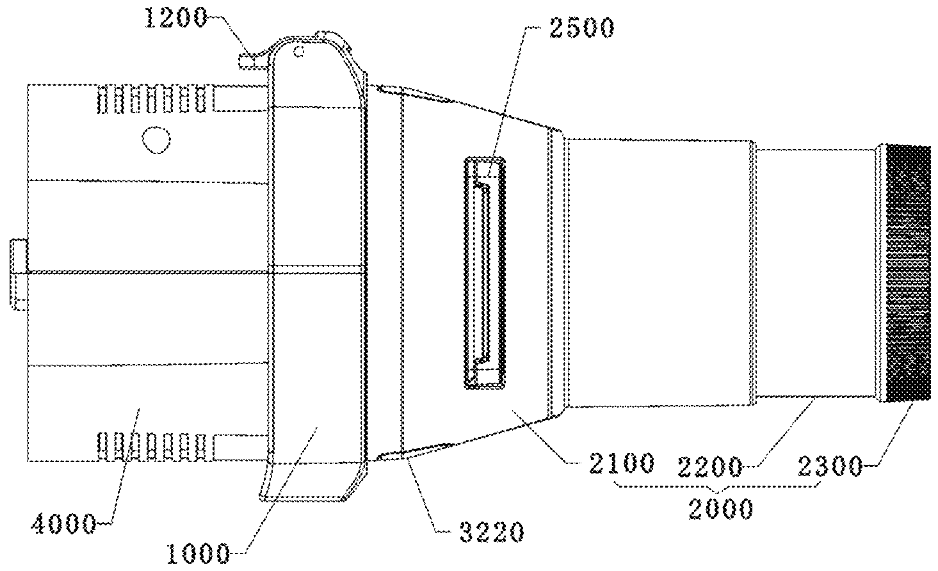
FIG. 3 is a front view of the flash light shown in FIG. 2.
Figure 4:
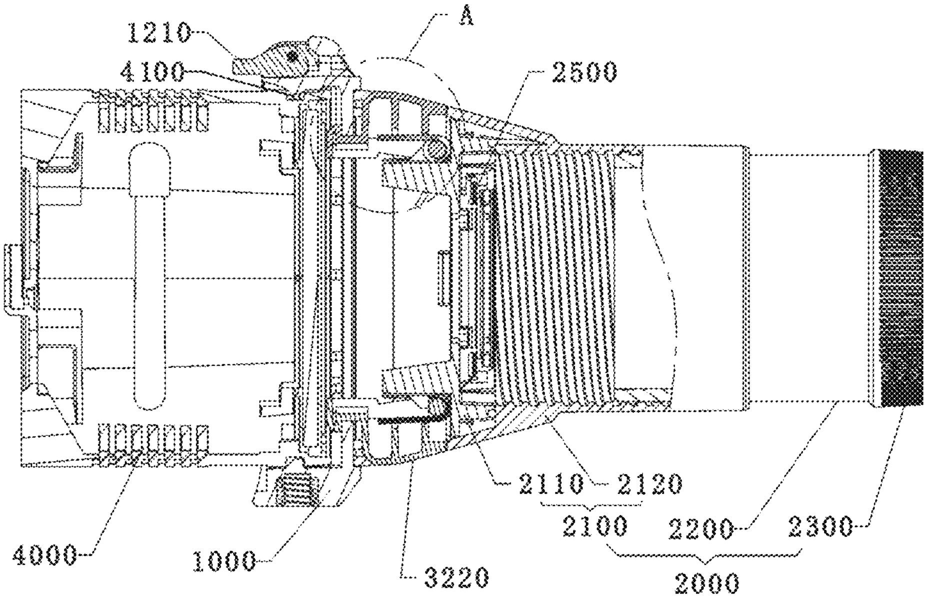
FIG. 4 is a partial sectional view of the flash light shown in FIG. 3.
Figure 5:
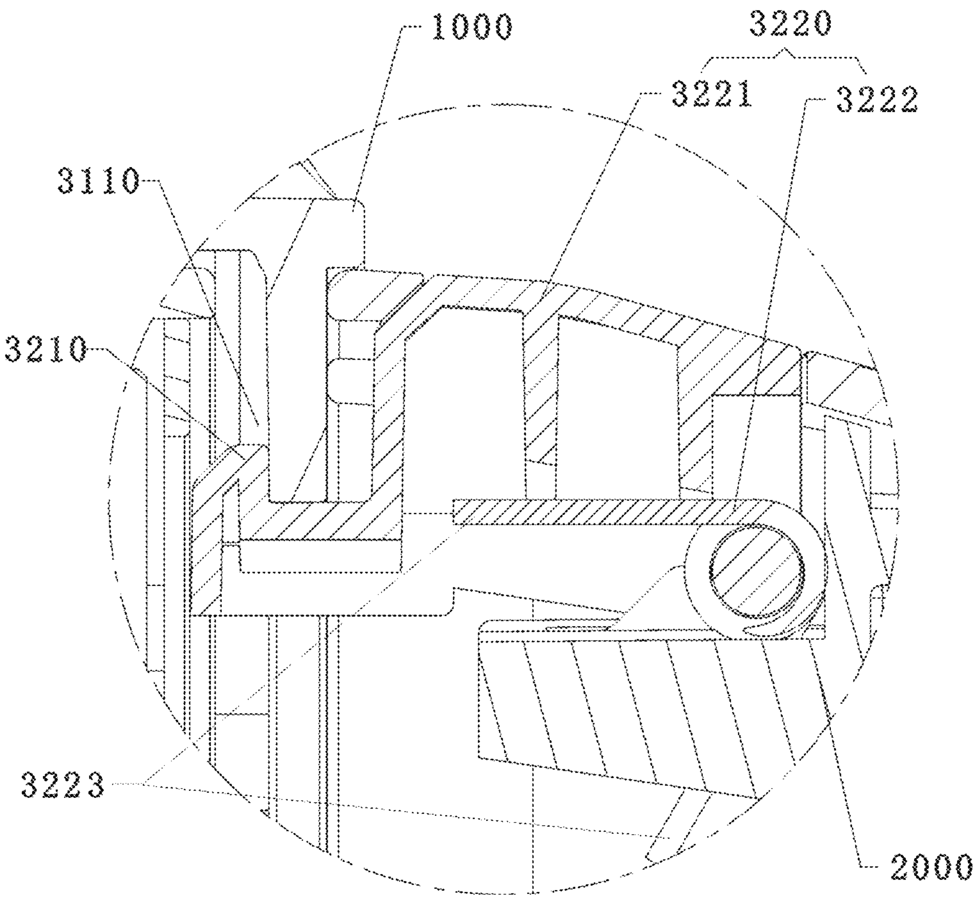
FIG. 5 is a partially enlarged view of FIG. 4 at A.
Figure 6:
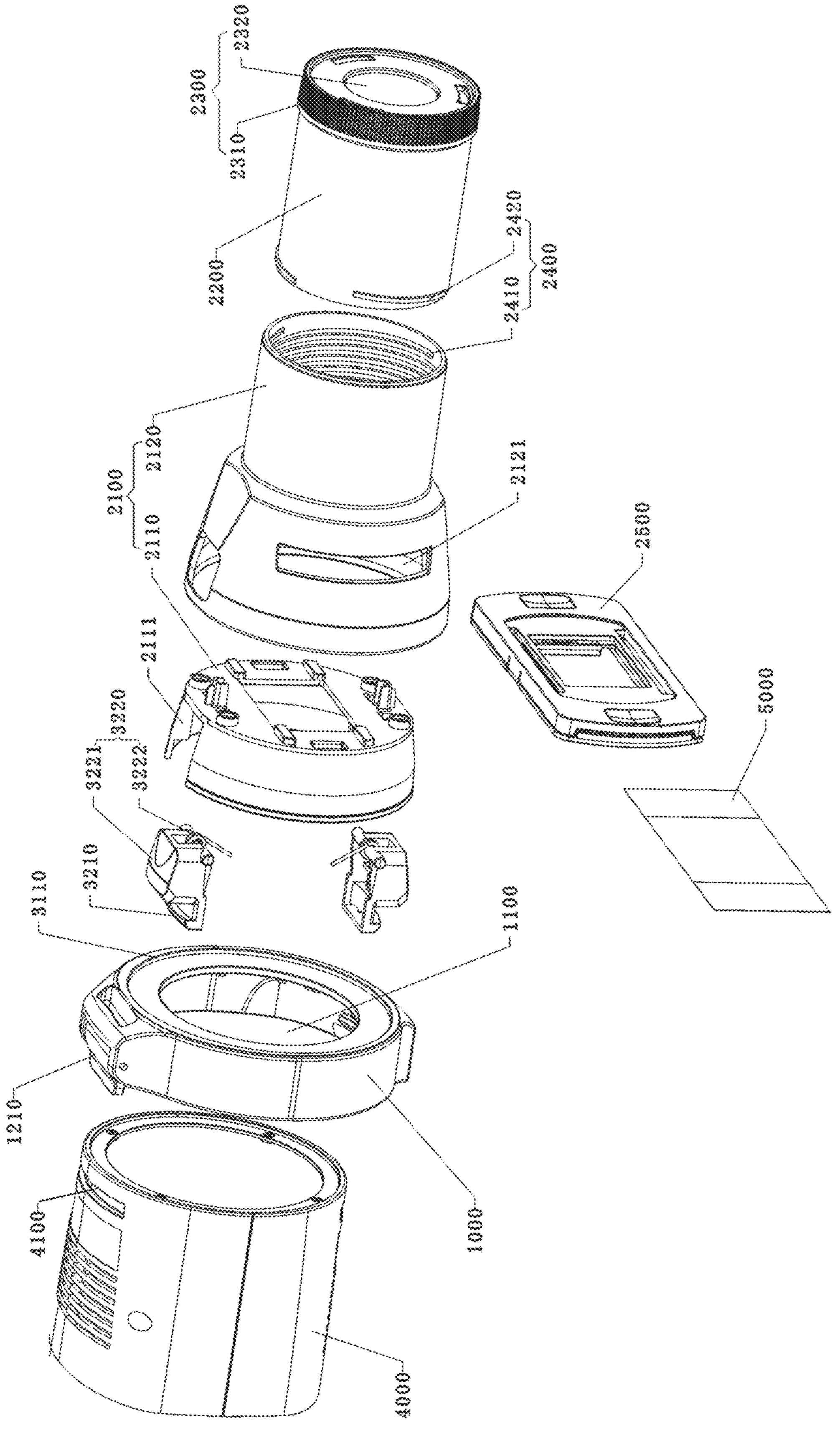
FIG. 6 is an exploded view of the flash light shown in FIG. 2.
Figure 7:
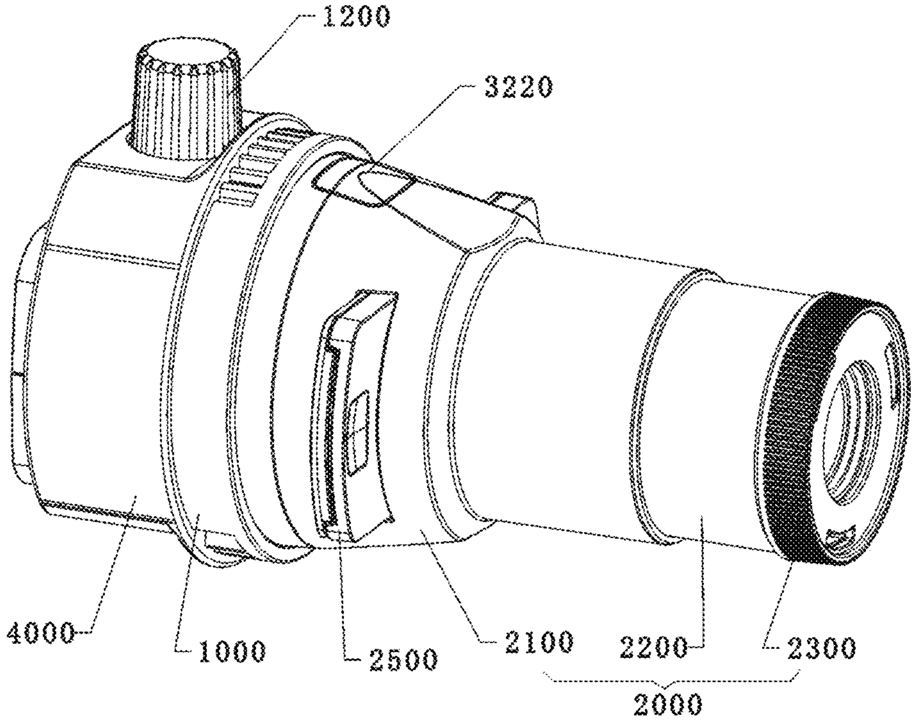
FIG. 7 is a second three-dimensional view of the flash light shown.
Figure 8:
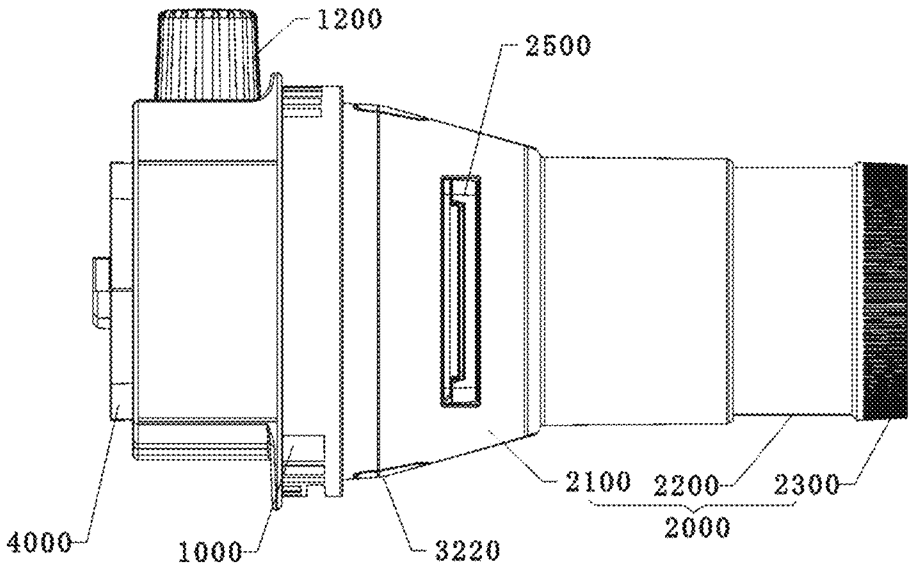
FIG. 8 is a front view of the flash light shown in FIG. 7.
Figure 9:
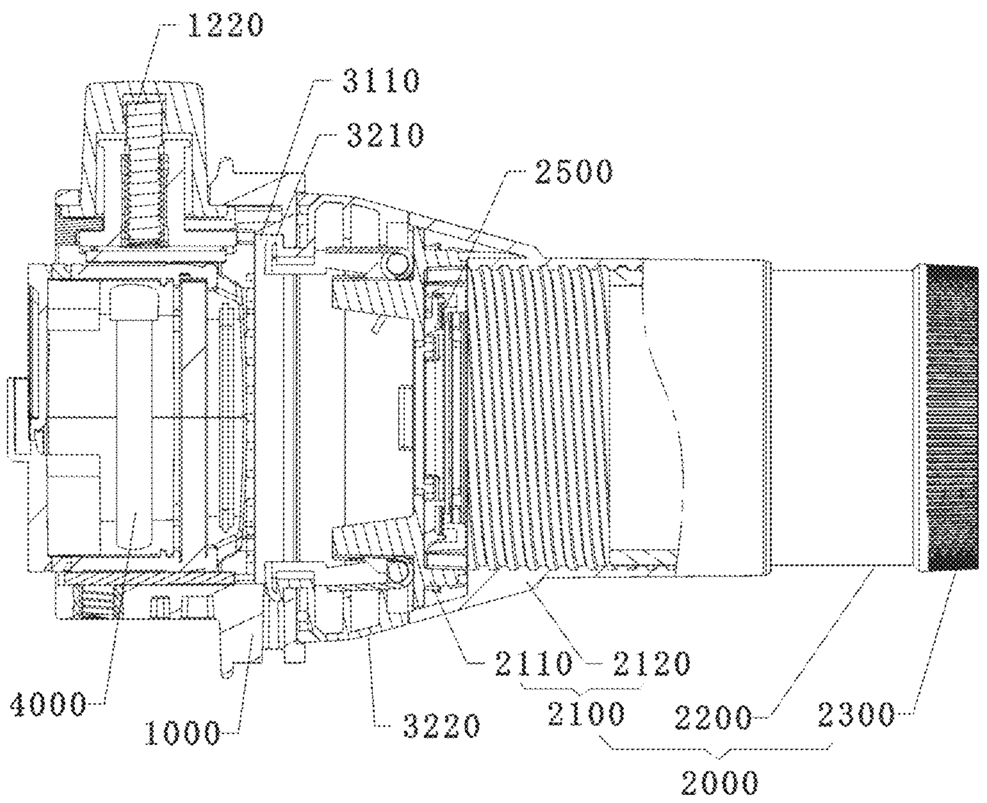
FIG. 9 is a partial sectional view of the flash light shown in FIG. 8.
Figure 10:
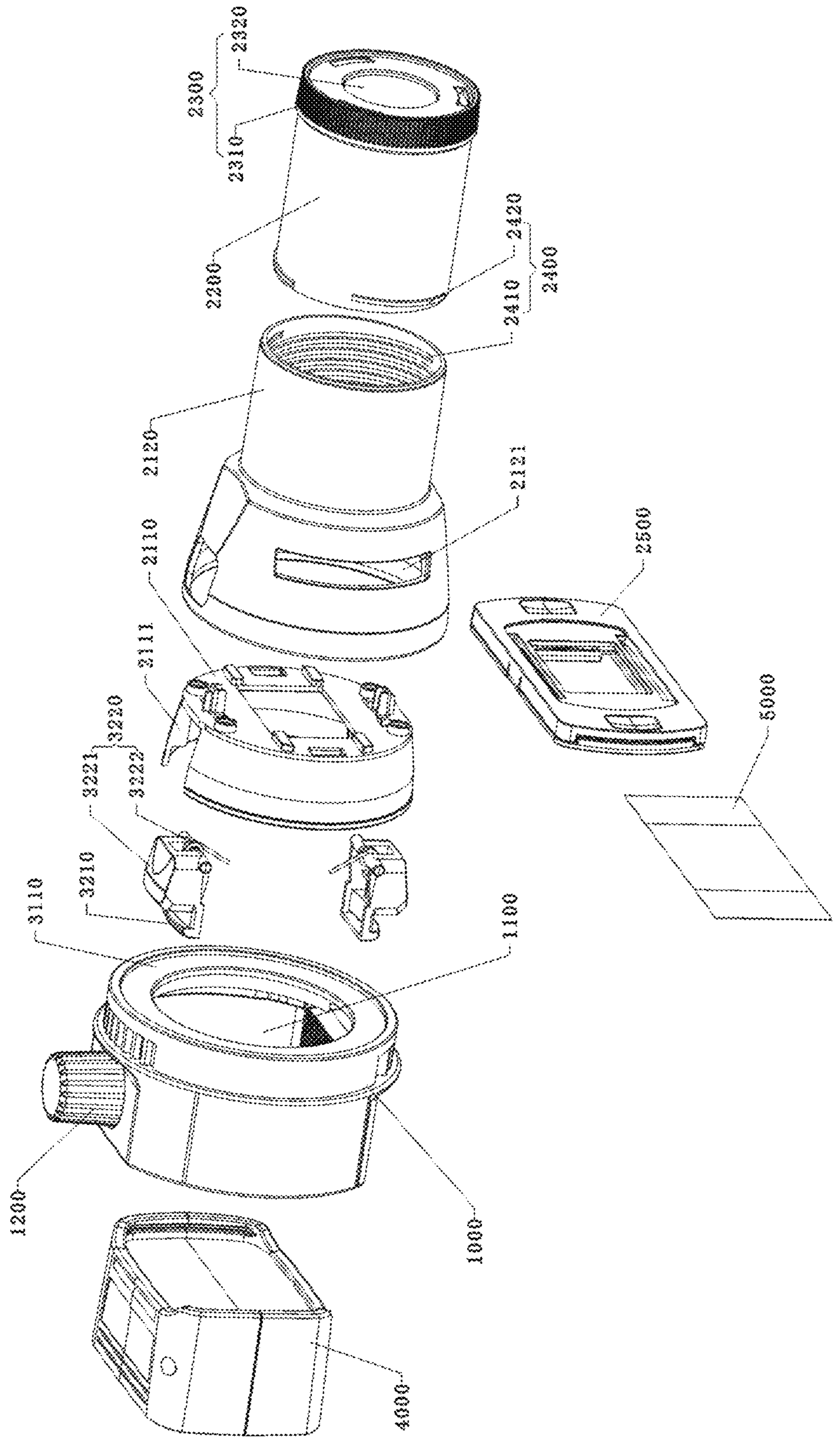
FIG. 10 is an exploded view of the flash light shown in FIG. 7.

Referring to FIGS. 1, 6, and 10, the present application provides a light effector, which includes an adapter seat 1000 and a focusing assembly 2000 provided along the axis of the light effector 100. The focusing assembly 2000 is provided with a screen sheet accommodation cavity 2121 for mounting a screen sheet 5000, and the adapter seat 1000 can be assembled on an external light head 4000. The light transmission holes in the adapter seat 1000, the light transmission holes in the focusing assembly 2000, and the screen sheet accommodation cavity 2121 are located on the same axis. The light emitted from the light head 4000 can pass through the adapter seat 1000, the focusing assembly 2000, and the screen sheet 5000 placed in the screen sheet accommodation cavity 2121.

The light effector 100 also includes a first connection member 3000 provided between the adapter seat 1000 and the focusing assembly 2000. The adapter seat 1000 and the focusing assembly 2000 are connected together by the first connection member 3000, such that the adapter seat 1000 and the focusing assembly 2000 are on the same axis, thus the light emitted from the light head 4000 can pass through the adapter seat 1000 and the focusing assembly 2000. When the light passes through the focusing assembly 2000, the light will pass through the screen sheet, creating a corresponding photographic light effect.

Specifically, the first connection member 3000 includes a first connection portion 3100 and a second connection portion 3200. The first connection portion 3100 is provided on the adapter seat 1000, and the second connection portion 3200 is provided on the focusing assembly 2000. The second connection portion 3200 is snap-fit with the first connection portion 3100, so that the focusing assembly 2000 and the adapter seat 1000 are limited in the axis of the light effector 100, the adapter seat 1000 is connected to the focusing assembly 2000 together. The second connection portion 3200 is snap-fit with the first connection portion 3100 together to make the focusing assembly 2000 and the adapter seat 1000 be detachable from each other. When it is necessary to install a light effector on the flash light with different shapes of light heads, it only needs to select an adapter seat that fits the shape of the light head, thereby improving the scope of application of the light effector, so that the user no longer needs to purchase a plurality of different light effectors, which effectively reduces the user's cost of use, saves storage space, and improves the user's experience of use.

As the adapter seat 1000 is provided, the adapter seat 1000 is adapted to the light head 4000. The second connection portion 3200 is movably snap-fit with the first connection portion 3100, i.e., the second connection portion 3200 is detachable from the first connection portion 3100. Thus, the adapter seat 1000 on the focusing assembly 2000 can be replaced conveniently, to adapt to different flash lights with different light heads 4000.

The first connection portion 3100 is provided with a curved surface, and the second connection portion 3200 can rotate along the curved surface to adjust the angle of the screen sheet 5000 on the focusing assembly 2000. In other words, the second connection portion 3200 on the focusing assembly 2000 is snap-fit together with the first connection portion 3100 on the adapter seat 1000, so that the second connection portion 3200 is rotationally connected to the first connection portion 3100. Since the second connection portion 3200 is provided on the focusing assembly 2000, and the first connection portion 3100 is provided on the adapter seat 1000. Therefore, the user can rotate the focusing assembly 2000, thereby adjusting the angle of the screen sheet 5000 on the focusing assembly 2000, to adjust an inclined angle of the pattern projected by the screen sheet 5000. The inclined angle refers to the angle of the screen sheet 5000 in the circumferential direction, so that the pattern sets off the photographed object, the aesthetics of the photograph is improved.

By adjusting the inclined angle of the pattern projected by the screen sheet 5000, the photographic light effect on the photographed object can meet the photographic requirements and the aesthetics of the photographed photographs is improved. For example, after the light passes through the screen sheet, a square light region is formed, and after rotating 45°, a prismatic light region is formed. For another example, different positions of the screen sheet 5000 have different shading rates, and by adjusting the angle of the screen sheet, the effect of light irradiated at different positions of the photographed object is different.

Referring to FIG. 1, FIGS. 4-6, FIG. 9, and FIG. 10, in some embodiments, the first connection portion 3100 includes a curved snap groove 3110, and the second connection portion 3200 includes a curved snap tooth 3210. The curved snap tooth 3210 can be snapped into the curved snap groove 3110. The curved snap groove 3110 may be circular or may be a partially circular segment. After the curved snap teeth 3210 are snapped into the curved snap groove 3110, the curved snap teeth 3210 can rotate circumferentially. That is, the focusing assembly 2000 can be rotated circumferentially because it is connected by connection of the curved snap groove 3110 to the curved snap teeth 3210, to adjust the angle of the screen sheet 5000.

In the above, when the curved snap groove 3110 is circular, the focusing assembly 2000 can be rotated 360° in a circumferential direction. That is, the angle of the screen sheet 5000 can be adjusted in the range of 0-360° in the circumferential direction. When the curved snap groove 3110 is a circular segment, the width of the curved snap teeth 3210 is less than the length of the curved snap groove 3110, and therefore, there is a gap on the curved snap groove 3110 required for the rotation of the curved snap teeth 3210.

Referring to FIGS. 2-10, in some embodiments, the second connection portion 3200 includes an elastic snap-fit 3220, an end of the elastic snap-fit 3220 is provided on the focusing assembly 2000 and another end of the elastic snap-fit 3220 is overhung, the overhung end of the elastic snap-fit 3220 faces the adapter seat 1000 and has the curved snap teeth 3210. Thus, an end of the elastic snap-fit 3220 with the curved snap teeth 3210 can extend into the curved snap groove 3110 on the adapter seat 1000, to make the curved snap teeth 3210 to snap into the curved snap groove 3110.

The focusing assembly 2000 is connected to the adapter seat 1000 by the elastic snap-fit 3220. When rotating the focusing assembly 2000, the elastic snap-fit 3220 can be deformed to avoid wear of the curved snap teeth 3210 on the elastic snap-fit 3220. When the rotation of the focusing assembly 2000 is stopped, the elastic snap-fit 3220 is reset under the action of its own elasticity, so that the state of compression between the focusing assembly 2000 and the adapter seat 1000 is restored.

The elastic snap-fit 3220 includes a snap-fit made of elastic material, for example, a snap-fit made of plastic, a snap-fit made of steel sheet. The elastic snap-fit 3220 also includes a snap-fit composed of a steel snap-fit and an elastic structure, for example, a snap-fit with an elastic function formed by a rigid snap-fit and a shrapnel, a snap-fit with an elastic function formed by a rigid snap-fit and a spring.

Referring to FIGS. 4-6 and FIGS. 9-10, in a detailed embodiment, the elastic snap-fit 3220 includes a first snap-fit 3221 and an elastic member 3222. An end of the first snap-fit 3221 is rotationally connected to the focusing assembly 2000, and an end of the first snap-fit 3221 away from the focusing assembly 2000 is provided with curved snap teeth 3210. An end of the elastic member 3222 is connected to the first snap-fit 3221, and another end of the elastic member 3222 is connected to the focusing assembly 2000, so that the curved snap teeth 3210 on the first snap-fit 3221 can be pressed into the curved snap groove 3110. Since the first snap-fit 3221 is rotationally connected to the focusing assembly 2000, when the first snap-fit 3221 is snapped into the curved snap groove 3110, it limits the first snap-fit 3221 from swinging to a side of the curved snap groove 3110. The elastic member 3222 is utilized to provide a force for the first snap-fit 3221 to press the curved snap groove 3110, so that the curved snap teeth 3210 can be pressed within the curved snap groove 3110.

In detail, the elastic member 3222 includes a torsion spring, the torsion spring is rotationally connected to the first snap-fit 3221 or the focusing assembly 2000. The torsion spring includes at least two torsion arms 3223. At least one of the torsion arms 3223 is abutted against the first snap-fit 3221, and at least one of the torsion arms 3223 is abutted against the focusing assembly 2000, to make the curved snap teeth 3210 on the first snap-fit 3221 to be pressed within the curved snap groove 3110. After the curved snap teeth 3210 are snapped into the curved snap groove 3110, the torsion spring is in a twisted state, which can provide a force for the curved snap teeth 3210 to be snapped into the curved snap groove 3110.

In order to facilitate the installation of the torsion spring and the deformation of the torsion spring, when the first snap-fit 3221 is rotationally connected to the focusing assembly 2000, there is a rotation point, and the torsion spring and the rotation point of the present application are on the same axis.

The elastic member 3222 further includes one or more of a compression spring, a spring plate, and an elastic rubber.

In some embodiments, the curved snap groove 3110 is provided on an inner side of the adapter seat 1000. The curved snap groove 3110 and the curved snap teeth 3210 that are snap-fit with the curved snap groove 3110 are hidden inside the adapter seat 1000, to make the light effector 100 more aesthetic. An avoidance groove 2111 is provided on the focusing assembly 2000, and the elastic snap-fit 3220 is provided inside the avoidance groove 2111. Therefore, the elastic snap-fit 3220 has a certain movable space, which also makes the user to press the elastic snap-fit 3220 at the avoidance groove 2111.

In the above, the focusing assembly 2000 is connected to the adapter seat 1000 by a first connection member 3000. The second connection portion 3200 of the first connection member 3000 includes the elastic snap-fit 3220, so that the focusing assembly 2000 and the adapter seat 1000 form a detachable connection structure. In other words, the elastic snap-fit 3220 is deformable, and the elastic snap-fit 3220 can be deformed by applying a deformation force, so that the curved snap teeth 3210 on the elastic snap-fit 3220 are separated from the curved snap groove 3110 on the adapter seat 1000, thereby enabling the focusing assembly 2000 to move in the axis of the light effector 100 to a position where the focusing assembly is separated from the adapter seat 1000, thus a detachable connection of the focusing assembly 2000 and the adapter seat 1000 is achieved. When the focusing assembly 2000 or the adapter seat 1000 needs to be replaced, the curved snap teeth 3210 is separated from the curved snap groove 3110 at where they are snapped.

In some embodiments, two first connection members 3000 are provided at 180° along the axis of the focusing assembly 2000.

In this application, the diameter of the focusing assembly 2000 is in a range of 20 mm to 180 mm, so that the light effector 100 can be held with one hand. In the embodiment in which the first connection member 3000 is the elastic snap-fit 3220, when it is necessary to separate the focusing assembly 2000 from the adapter seat 1000 at the first connection member 3000, the light effector 100 can be held with one hand, and then two fingers can be used to press against two elastic snap-fits 3220, respectively, to remove the curved snap-fits 3210 from the curved snap-fits 3110. The removal of the focusing assembly 2000 and the adapter seat facilitates the user to replace the light head 4000 with the adapter seat 1000 that fits the light head 4000 according to the shape of the light head 4000, so that the light effector 100 can be provided on different shapes of the light heads 4000.

Referring to FIGS. 4-6 and FIGS. 9-10, in some embodiments, the focusing assembly 2000 includes a housing 2100, a focusing barrel 2200, and a lens structure 2300. The focusing assembly 2000 further includes a second connection member 2400, the second connection member 2400 is provided between the housing 2100 and the focusing barrel 2200. The second connection member 2400 includes a third connection portion 2410 and a fourth connection portion 2420, and the third connection portion 2410 is provided on the housing 2100. The fourth connection portion 2420 is provided on the focusing barrel 2200, and the third connection portion 2410 is screwed together with the fourth connection portion 2420. The contact surface of the third connection portion 2410 and the fourth connection portion 2420 is helical, so that the fourth connection portion 2420 can move along the axis of the third connection portion 2410 to adjust the distance between the focusing barrel 2200 and the housing 2100 in the axis.

In the above, since the third connection portion 2410 is screwed together with the fourth connection portion 2420, the fourth connection portion 2420 can rotate in the circumferential direction of the third connection portion 2410. When the focusing barrel 2200 is rotated in the axis, the focusing barrel 2200 can move in the axis, to adjust the distance between the focusing barrel 2200 and the housing 2100 in the axis, so that the distance between the light head 4000 and the lens structure 2300 connected to the focusing barrel 2200 can be changed, to achieve the focusing function. The third connection portion 2410 includes a spiral groove, and the fourth connection portion 2420 includes a spiral protrusion.

For the lens structure 2300 to be replaceable, the lens structure 2300 is detachably connected to the focusing barrel 2200, and the lens structure 2300 is provided at an end of the focusing barrel 2200 away from the housing 2100.

Specifically, the lens structure 2300 includes a lens seat 2320 and a lens set 2310. The lens set 2310 is fixed to the lens seat 2320, and the lens seat 2320 is detachably connected to the focusing barrel 2200. The detachable connection may be realized by threads, screw connections and/or snap connections to replace the lens structure 2300 conveniently. In specific applications, a plurality of lens structures 2300 may be provided, the lens sets 2310 in each lens structure 2300 all produce different light effects, such as different color filters. Since the lens structure 2300 is detachably connected to the focusing barrel 2200, the user can change the lens structure 2300 according to his or her own usage needs to achieve the desired photographic light effect.

The screen sheet accommodation cavity 2121 is provided on the housing, and the screen sheet box 2500 is located between the focusing barrel 2200 and the adapter seat 1000. In order to make the screen sheet 5000 replaceable, a screen sheet box 2500 is detachably connected inside the screen sheet accommodation cavity 2121, and the screen sheet 5000 is detachably connected inside the screen sheet box 2500. When the screen sheet box 2500 is placed within the screen sheet accommodation cavity 2121, the screen sheet 5000 is placed on an axis of the light effector 100. The screen sheet box 2500 is detachably connected to the housing 2100 by a screw and/or a snap-fit. The screen sheet 5000 can be detachably connected to the screen sheet box 2500 by the screw and/or the snap-fit. In order to facilitate the disassembly and assembly of the screen sheet box 2500, at least one side of the screen sheet accommodation cavity 2121 is communicated with the outer surface of the housing to form a screen sheet accommodation cavity 2121 that is adapted to the screen sheet box 2500, so that the screen sheet box 2500 can be inserted into the screen sheet accommodation cavity 2121 directly from the outside of the housing.

The housing 2100 includes a rear housing 2110 and a front housing 2120, and the front housing 2120 is fixed to the rear housing 2110. A second connection portion 3200 connected to the adapter seat 1000 is provided on the rear housing 2110, and the focusing barrel 2200 is connected to the front housing 2120, i.e., the third connection portion 2410 is provided on the front housing 2120. A screen sheet accommodation cavity 2121 is provided on the front housing 2120.

Referring to FIGS. 2-10, a flash light includes the light effector 100 described above, and a light head 4000. The light head 4000 is provided on an end of the adapter seat 1000 of the light effector 100 away from the focusing assembly 2000, and the light head 4000 is configured to provide light emitted in the axis of the light effector 100. The light effector 100 is applied to the flash light, to adjust the photographic light effect of the flash light. The light head 4000 is detachably connected to the adapter seat 1000, such that the light head 4000 can be replaced.

In an embodiment, the light head 4000 includes a round light head and a square light head. The adapter seat 1000 is provided with a mounting hole 1100 adapted to the outer contour of the light head 4000. After the light head 4000 is inserted into the mounting hole 1100, an interference fit is formed to realize a fixation of the light head 4000 to the adapter seat 1000.

In an embodiment, the adapter seat 1000 is provided with a locking member 1200 for fixing the light head 4000 to the adapter seat 1000, and the light head 4000 can be fixed to the adapter seat 1000 by the locking member 1200 to realize the installation of the light head 4000.

In one embodiment, the adapter seat 1000 is provided with a mounting hole 1100 adapted to an outer contour of the light head 4000, and the adapter seat 1000 is provided with a locking member 1200 for fixing the light head 4000 to the adapter seat 1000. An end of the light head 4000 is inserted into the mounting hole 1100 to position the light head 4000, and then the light head 4000 is locked to the adapter seat 1000 by the locking member 1200.

In the above, the locking member 1200 includes a second snap-fit 1210 and/or a locking screw 1220.

Referring to FIGS. 2-6, in the detailed embodiment, the light head 4000 includes a round light head, the adapter seat 1000 includes a round adapter seat 1000, and the locking member 1200 includes the second snap-fit 1210. After an end of the light head 4000 is inserted into the mounting hole 1100, the second snap-fit 1210 is snapped to the end of the light head 4000 away from the adapter seat 1000 to fix the round light head. Alternatively, a snap groove 4100 is provided on the light head 4000, and after an end of the light head 4000 is inserted into the mounting hole 1100, the second snap-fit 1210 is snapped to the snap groove 4100 to fix the round light head.

Referring to FIGS. 7-10, in one embodiment, the light head 4000 includes a square light head, the adapter seat 1000 includes a square adapter seat 1000, and the locking member 1200 includes a locking screw 1220, which is threaded in the adapter seat 1000 along the radial direction of the adapter seat 1000. Since there is a flat surface on the outer surface of the square light head, after an end of the light head 4000 is inserted into the mounting holes 1100, the locking screw 1220 is rotated, so that the end of the locking screw 1220 provided within the adapter seat 1000 abuts against the square light head, to fix the square light head.

In the description of the present application, it is to be understood that the terms "length", "width", "thickness", "up", "bottom", "front", "back", "inside", "outside", etc. indicate orientations or positional relationships based on those shown in the accompanying drawings, and are intended only to facilitate and simplify the description of the present application, and are not intended to indicate or imply that the device or element referred to must have a particular orientation, be constructed and operated with a particular orientation, and therefore are not to be construed as a limitation of the present application.

Furthermore, the terms "first" and "second" are used only for descriptive purposes and are not to be understood as indicating or implying relative importance or implicitly specifying the number of technical features indicated. Thus, a feature defined with "first", "second" may expressly or implicitly include one or more of the described features. In the description of the present application, "more than one" means two or more, unless otherwise expressly and specifically limited.

In the description of the present application, it is to be noted that, unless otherwise expressly specified and limited, the terms "provided", "coupled", "connected" are to be understood in a broad sense, e.g., they may be, for example, a fixed connection, a detachable connection, or a connection in one piece; or a mechanical connection, an electrical connection, or a communication with each other; or a direct connection or an indirect connection through an intermediate medium; or a connection within the two elements or an interaction between the two elements. For those skilled in the art, the specific meaning of the above terms in the present application may be understood in the context of the specific situation.

It is understood that for those skilled in the art, equivalent substitutions or changes may be made in accordance with the technical solution of the present application and its inventive concept, and all such changes or substitutions shall fall within the scope of the present application.

What is claimed is:

1. A light effector, comprising an adapter seat and a focusing assembly provided along an axis of the light effector;

wherein the focusing assembly is provided with a screen sheet accommodation cavity for mounting a screen sheet, an end of the adapter seat away from the focusing assembly is capable of being detachably connected to an external light head, and a light transmission hole of the adapter seat, a light transmission hole of the focusing assembly, and the screen sheet accommodation cavity are located at the same axis;

wherein the light effector further comprises a first connection member provided between the adapter seat and the light effector;

wherein the first connection member comprises a first connection portion and a second connection portion, the first connection portion is provided on the adapter seat and the second connection portion is provided on the focusing assembly;

wherein the second connection portion is snap-fit with the first connection portion, to limit the focusing assembly and the adapter seat in the axis of the light effector, and to make the first connection portion and the second connection portion detachable from each other; and wherein a mounting hole configured to be adapted to an outer contour of the light head is provided in the adapter seat, and the mounting hole is configured to have an end of the light head inserted into the mounting hole to position the light head.

2. The light effector according to claim 1, wherein the first connection portion is provided with a curved surface, and the second connection portion is rotatable along the curved surface to adjust an angle where the screen sheet is provided on the focusing assembly.

3. The light effector according to claim 2, wherein the first connection portion comprises a curved snap groove, the second connection portion comprises curved snap teeth, the curved snap teeth are able to be snapped into the curved snap groove.

4. The light effector according to claim 3, wherein the second connection portion comprises an elastic snap-fit, an end of the elastic snap-fit is provided on the focusing assembly, and another end of the elastic snap-fit is overhung and faces the adapter seat and provided with the curved snap teeth.

5. The light effector according to claim 4, wherein the elastic snap-fit comprises a first snap-fit and an elastic member, an end of the first snap-fit is rotationally connected to the focusing assembly, and an end of the first snap-fit away from the focusing assembly is provided with the curved snap teeth; and an end of the elastic member is connected to the first snap-fit, and another end of the first snap-fit is connected to the focusing assembly, to make the curved snap teeth on the first snap-fit be pressed into the curved snap groove.

6. The light effector according to claim 5, wherein the elastic member comprises a torsion spring, the torsion spring is rotationally connected to the first snap-fit or the focusing assembly, and the torsion spring comprises at least two torsion arms;

wherein at least one of the at least two torsion arms is abutted against the first snap-fit, and at least one of the at least two torsion arms is abutted against the focusing assembly, to make the curved snap teeth on the first snap-fit be pressed into the curved snap groove.

7. The light effector according to claim 4, wherein the curved snap groove is provided on an inner side of the adapter seat, to make the curved snap groove and the curved snap teeth snapped into the curved snap groove to be hidden inside the adapter seat, the focusing assembly is provided with an avoidance groove, and the elastic snap-fit is provided inside the avoidance groove.

8. The light effector according to claim 3, wherein:

the curved snap groove is circular, to make the focusing assembly to rotate 360° circumferentially; or the curved snap groove is a circular segment, and a width of each curved snap tooth is less than a length of the curved snap groove, to allow for a gap in the curved snap groove required for rotation of the curved snap teeth.

9. The light effector according to claim 1, wherein two first connection members are provided at 180° along the axis of the focusing assembly.

10. The light effector according to claim 1, wherein the focusing assembly comprises a housing, a focusing barrel and a lens structure;

wherein the lens structure is connected to the focusing barrel, the focusing assembly further comprises a second connection member, and the second connection member is provided between the housing and the focusing barrel;

wherein the second connection member comprises a third connection portion and a fourth connection portion, the third connection portion is provided on the housing, and the fourth connection portion is provided on the focusing barrel;

wherein the third connection portion is screwed to the fourth connection portion, and a contact surface where the third connection portion contacts the fourth connection portion is helical, to make the fourth connection portion move along an axis of the third connection portion, to adjust a distance between the focusing barrel and the housing in the axis of the third connection portion.

11. The light effector according to claim 10, wherein the lens structure is detachably connected to the focusing barrel, and the lens structure is provided at an end of the focusing barrel away from the housing;

wherein the screen sheet accommodation cavity is provided on the housing, and located between the focusing barrel and the adapter seat, a screen sheet box is detachably connected inside the screen sheet accommodation cavity; and wherein the screen sheet is detachably connected inside the screen sheet box, and the screen sheet is placed in an axial center of the light effector when the screen sheet box is placed inside the screen sheet accommodation cavity.

12. The light effector according to claim 11, wherein the lens structure comprises a lens seat and a lens set, the lens set is fixed to the lens seat, and the lens seat is detachably connected to the focusing barrel.

13. The light effector according to claim 11, wherein at least one side of the screen sheet accommodation cavity is communicated with an outer surface of the housing to form the screen sheet accommodation cavity adapted to the screen sheet box, and the screen sheet box is able to be inserted into the screen sheet accommodation cavity from outside of the housing.

14. A flash light, comprising a light effector, wherein the light effector comprises an adapter seat and a focusing assembly provided along an axis of the light effector;

wherein the focusing assembly is provided with a screen sheet accommodation cavity for mounting a screen sheet, the adapter seat is capable of being assembled to an external light head, and a light transmission hole of the adapter seat, a light transmission hole of the focusing assembly, and the screen sheet accommodation cavity are located at the same axis;

wherein the light effector further comprises a first connection member provided between the adapter seat and the light effector;

wherein the first connection member comprises a first connection portion and a second connection portion, the first connection portion is provided on the adapter seat and the second connection portion is provided on the focusing assembly;

wherein the second connection portion is snap-fit with the first connection portion, to limit the focusing assembly and the adapter seat in the axis of the light effector, and to make the first connection portion and the second connection portion detachable from each other;

wherein the flash light further comprises a light head, wherein the light head is provided on an end of the adapter seat of the light effector away from the focusing assembly, and the light head is detachably connected to the adapter seat; and wherein a mounting hole adapted to an outer contour of the light head is provided in the adapter seat, and an end of the light head is inserted into the mounting hole to position the light head.

15. The flash light according to claim 14, wherein the light head comprises a round light head or a square light head; and a locking member is provided on the adapter seat, and the locking member is configured to fix the light head to the adapter seat.

16. The flash light according to claim 14, wherein the first connection portion is provided with a curved surface, and the second connection portion is rotatable along the curved surface to adjust an angle where the screen sheet is provided on the focusing assembly.

17. The flash light according to claim 16, wherein the first connection portion comprises a curved snap groove, the second connection portion comprises curved snap teeth, the curved snap teeth are able to be snapped into the curved snap groove.

18. The flash light according to claim 17, wherein the second connection portion comprises an elastic snap-fit, an end of the elastic snap-fit is provided on the focusing assembly, and another end of the elastic snap-fit is overhung and faces the adapter seat and provided with the curved snap teeth.

19. The flash light according to claim 18, wherein the elastic snap-fit comprises a first snap-fit and an elastic member, an end of the first snap-fit is rotationally connected to the focusing assembly, and an end of the first snap-fit away from the focusing assembly is provided with the curved snap teeth; and an end of the elastic member is connected to the first snap-fit, and another end of the first snap-fit is connected to the focusing assembly, to make the curved snap teeth on the first snap-fit be pressed into the curved snap groove.

20. The flash light according to claim 19, wherein the elastic member comprises a torsion spring, the torsion spring is rotationally connected to the first snap-fit or the focusing assembly, and the torsion spring comprises at least two torsion arms;

wherein at least one of the at least two torsion arms is abutted against the first snap-fit, and at least one of the at least two torsion arms is abutted against the focusing assembly, to make the curved snap teeth on the first snap-fit be pressed into the curved snap groove.

* * * * *